Dec. 8, 1964  P. G. M. H. KUPPERS  3,160,493
METHOD FOR CUTTING A MOLTEN GLASS STREAM
Filed May 10, 1960  5 Sheets-Sheet 1

INVENTOR
PIERRE G.M.H. KÜPPERS
BY
AGENT

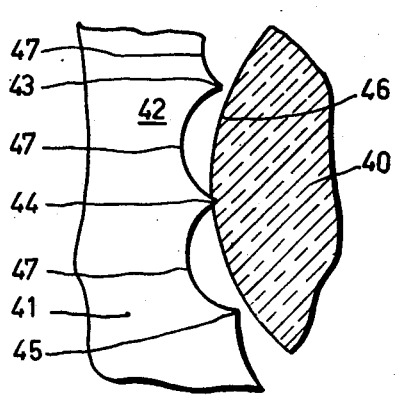
FIG. 7
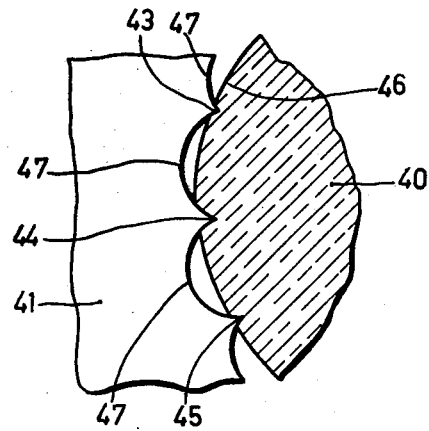
FIG. 8
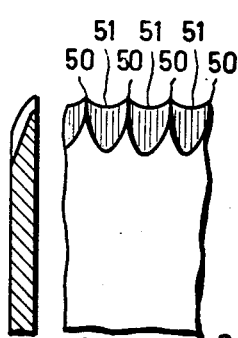
FIG.9ᵇ FIG.9ᵃ
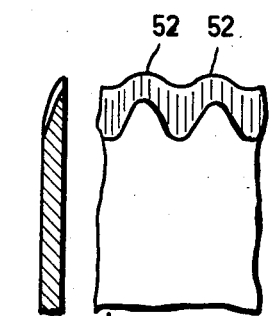
FIG.10ᵇ FIG.10ᵃ
FIG.11ᵇ FIG.11ᵃ

Dec. 8, 1964         P. G. M. H. KUPPERS         3,160,493
METHOD FOR CUTTING A MOLTEN GLASS STREAM
Filed May 10, 1960                       5 Sheets-Sheet 4

INVENTOR
PIERRE G.M.H. KÜPPERS
BY
AGENT

Dec. 8, 1964 P. G. M. H. KUPPERS 3,160,493
METHOD FOR CUTTING A MOLTEN GLASS STREAM
Filed May 10, 1960 5 Sheets-Sheet 5

INVENTOR
PIERRE G.M.H. KÜPPERS

BY
Frank R. Trifari
AGENT

3,160,493
METHOD FOR CUTTING A MOLTEN GLASS STREAM

Pierre Gerard Marie Hubert Kuppers, Eindhoven, Netherlands, assignor to North American Philips Company, Inc., New York, N.Y., a corporation of Delaware
Filed May 10, 1960, Ser. No. 28,045
Claims priority, application Netherlands May 13, 1959
2 Claims. (Cl. 65—133)

Methods are known for cutting a portion from a glass stream by means of a cutting mechanism comprising two or more blades, in which the periphery of the cross section of the glass stream, as viewed in a direction at right angles to the direction of the length of the emerging glass stream, is brought into contact with the edge of at least one cutter blade at a plurality of relatively separate areas. A glass stream emerging, for example, from a feeder is thus divided into portions, which are supplied to means in which the desired product is manufactured from such a portion by means of further treatments of the glass which is then still in the hot state. Bringing the glass stream into contact with cutter blades results in local cooling of the glass. This cooled area can be found back in the portion cut off and is usually referred to as the "cutter mark." Now, it is possible to provide for at least one cutter mark to find its way in the means in which the portion is further shaped into an object at an area such that this cutter mark appears in the product at an area where it is not troublesome. In fact, part of the mass of the glass portion, after the object has been formed, is usually removed. However, it is in practice almost unfeasible to provide for the other cutter mark to come also in the waste glass, so that this second cutter mark can substantially always be found back in the finished product. This is not objectionable for a plurality of uses. However, in other cases, the particular use of the manufactured product does not allow the presence of such a cutter mark. As a result thereof, each object which is thus manufactured and upon which the requirement of a high optical homogeneity is imposed, is subjected to an after-treatment in order to remove this cutter mark. Such an after-treatment, which usually consists in grinding, is naturally time-consuming and hence expensive.

An object of the present invention is to provide steps which permit manufacturing glass objects from glass portions so that the cutter mark is present to a much lesser extent or invisible at all in such objects.

For this purpose, the method according to the invention is characterized in that the cutting of the glass portions is initiated by bringing the periphery of the cross-section of the glass stream into contact with the peaks of two or more teeth present on the edge of at least one cutter blade, thus resulting in the surface of the glass stream being locally broken through, whereas the intermediate portions of the glass surface are cut during the further cutting movement.

As will be explained in detail with reference to the description of the figures, when using a pair of cutters of known type, the blades of such cutters first exert a more or less deforming action upon the glass section enclosed by these blades, which is sometimes accompanied by a more or less choking action upon this section as a function of the shape of the cutter blade. In all probability a certain formation of folds then occurs in the comparatively cold outer surface of the glass stream, resulting in occlusions of gas being formed in the folds. Only during further movement of the cutter blades towards each other is this comparatively cold outer surface of the glass stream cut through by the edges of the blades. Now, according to the invention, by initiating the cutting of the glass portion by bringing the periphery of the cross-section of the glass stream into contact with the peaks of two or more teeth present on the edge of at least one cutter blade, the outer surface of the glass stream, which is still comparatively hot, is locally broken through either immediately or at any rate at a moment much earlier than is the case with the known cutting process, so that, as experience has shown, formation of folds in the outer surface of the glass stream occurs to a much lesser extent or substantially not at all, so that the risk of gas occlusions is also suppressed at least substantially.

In one advantageous embodiment of the method according to the invention, the cutting operation is initiated by bringing substantially the whole periphery of the cross-section of the glass stream into contact with the peaks of the teeth present on the edges of the cutter blades. By proceeding in this manner it is ensured that, as the cutter blades move towards each other, a movement of portions of the outer surface of the glass stream in the tangential direction thereof along the edges of the blades is counteracted, which results in the formation of folds in the outer surface being further counteracted.

The said teeth may be shaped at their front sides in different ways, notably they may have rounded or flat front sides. However, in one advantageous embodiment of the invention, it is preferable to provide the teeth with pointed front sides, since this shape naturally highly assists in the surface of the glass stream being locally broken through as quickly as possible.

Preferably, the edge of each of the blades of the glass cutters is provided with two or more such teeth. However, it is alternatively possible to provide the edge of only one cutter blade with two such teeth and to form the edge of the other blade without teeth.

It is possible to provide the teeth on a cutter blade which is straight, curved or polygonal in shape. In addition, when the cutter blades are moved towards each other, it is possible for all of the teeth to be brought into contact with the surface of the glass stream either simultaneously or shortly one after another.

In one advantageous embodiment of a device for carrying out the method according to the invention, each of the edges of the cutter blades is provided with fine teeth throughout its active length, the pitch of these teeth preferably being at the most 5 mms.

The invention is particularly advantageous for the manufacture of products in which the cutter mark must be visible to the least possible extent. Such is the case, for example, with the viewing screens used as component parts for bulbs of cathode-ray tubes. Applicant has found that by the use of the method according to the invention it is possible to arrive at a manufacture of such screens in which the grinding operation can be omitted in part or even completely.

In order that the invention may be readily carried into effect, several embodiments thereof will now be explained in detail, by way of example, with reference to the accompanying diagrammatic drawings, in which:

FIGURES 3, 4 and 5 are a plan view of the cutter blades and a cross-sectional view of the glass stream.

FIGURES 7 and 8 show, on a greatly enlarged scale, in what manner the cutting movement exerted upon the glass stream is initiated and continued when use is made of the cutters according to the invention.

FIGURES 9a, 9b, 10a, 10b, 11a, 11b show three embodimenst of edges of cutter blades which may be used in accordance with the invention.

For a proper understanding of the invention it is mentioned that preferably both cutter blades are provided with teeth. However, it is conceivable to provide only one cutter blade with a toothed edge and to form the edges of the other cutter blade without teeth.

Figure 1:
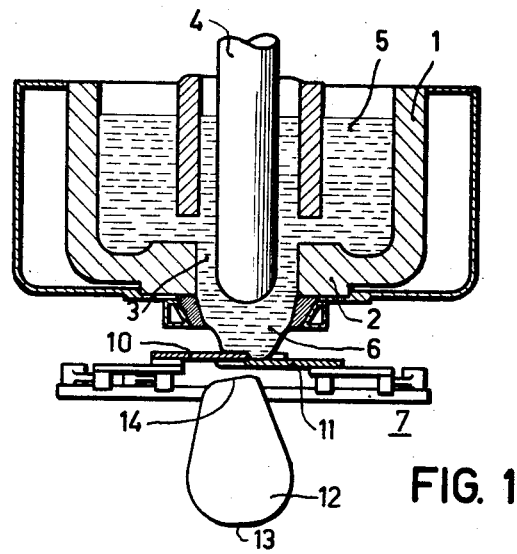
FIGURE 1 shows part of the feeder provided on a glass oven and the glass cutters positioned under the outflow aperture of such a feeder and this at the moment when the glass cutters have just cut a portion from the glass stream emerging from the feeder and the portion has come clear of the glass cutters.

The feeder shown in FIGURE 1 comprises a portion 1 of refractory material, the lower end of which has a contracted portion 2. A central aperture 3 provided in the portion 2 contains the lower end of a so-called feeder pin 4, which can be vertically moved up and down, if desired. 5 indicates an amount of molten glass which can leave the aperture 3 in a downward direction as a glass stream 6. The possibility of regulating the speed of emergence of the glass out of the aperture 3 will not be described in this specification. In addition, a cutter mechanism 7 comprising cutter blades 10 and 11 is provided under the outlet aperture 3.

A glass portion is cut from the glass stream 6 upon each cutting movement of the cutters. In FIGURE 1, the cutter blades 10 and 11 are closed so that a glass portion 12 has been cut from the glass stream 6 a few moments before. The portion, due to its fall, finds its way into a mechanism in which an object of the desired shape may be manufactured from this portion by means of suitable expedients.

Figure 2:
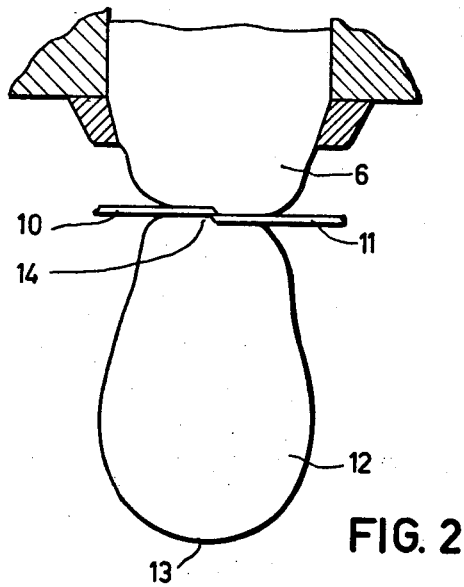
FIGURE 2 shows, on an enlarged scale, the glass stream and the cutters at the moment when the cutting operation is substantially completed.

Each portion cut from the glass stream has been in contact with the cutter blades at two areas. For the portion shown in FIGURE 1, these are the lower side 13 and the upper side 14. This may be seen more clearly from FIGURE 2. The glass portion 12 has been slightly damaged at 13 and 14 due to the glass having been in contact in the cutting zone with the cutter blades 10 and 11 which have a temperature lower than that of the glass itself. In this way the cutter mark is formed in the portion.

However, the cooling of the glass portion due to contact with the cutter blades, which cooling is detrimental to the quality of the object to be manufactured, is still accompanied in the case of conventional cutters by a second harmful effect which will be explained more fully with reference to FIGURES 3, 4 and 5. In these figures, 20 and 21 indicate the two co-acting blades of a conventional pair of glass cutters. These blades, which usually consist of a first-class alloyed steel, have curved edges 22 and 23 at their adjacent sides, which edges are not shaped as viewed in a direction at right angles to the cutter blade. The blades are provided with lugs 24, 25, 26 and 27, which serve to guide the blades along each other.

Figure 3:
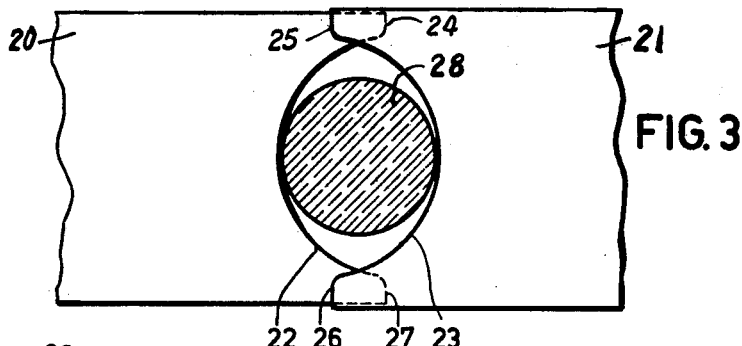
FIGURES 3, 4 and 5 show three sequential stages which occur when a portion is cut from a glass stream by means of a conventional pair of cutters.
Figure 4:
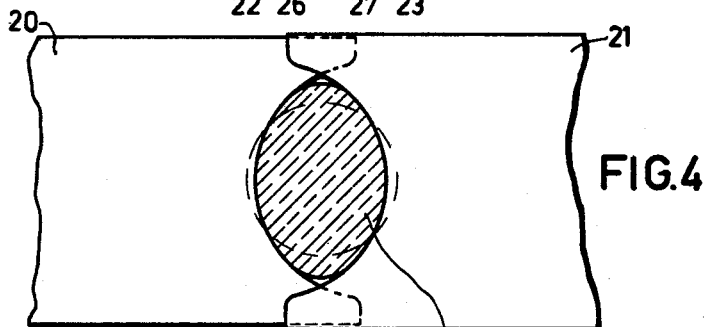
Figure 5:
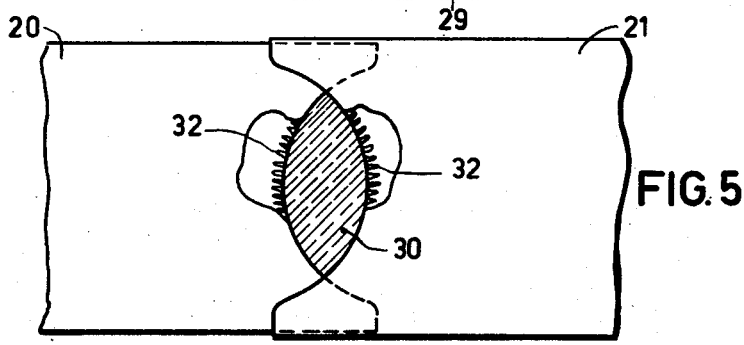

In FIGURES 3, 4 and 5, the cross-section of the glass stream is indicated by 28, 29 and 30 respectively. In FIGURE 3, this glass stream has a circular cross-section up to the moment when its surface comes into contact with the edges 22 and 23 of the blades and in the assumption that the aperture of the feeder also has a circular cross-section. When the blades are moved towards each other, as shown in FIGURE 4, and contact with the surface of the glass, the cross-sectional area of the glass stream is first deformed so as to correspond, at least substantially, to the shape which is still present between the edges of the blades at this moment. Cooling of the surface of the glass stream then occurs as a result of the contact of this surface with a comparatively large portion of the length of the edges of the blades. Consequently, the glass at the surface of the glass stream becomes less fluid.

When the blades are moved further towards each other, as shown in FIGURE 5, the glass portion is usually not cut from the glass stream immediately, but this operation is preceded or accompanied by a certain choking action upon the cross-sectional area of the glass stream. This action entails the formation of folds on the outer surface of the cross-section of the glass, as indicated diagrammatically by 32 in FIGURE 5. Due to this formation of folds, occlusions of gas may occur in these folds which cannot escape therefrom afterwards due to the progressive cooling of the glass and the closing of the folds.

When the glass portion separates from the glass stream, it finds its way into a glass moulding device in which the desired object may be manufactured from the cut portion by means of suitable expedients. The presence of the cutter mark which has found its way in the glass portion will be more or less troublesome as a function of the desired product.

If it is desired to manufacture an object from the glass portion in which such a cutter mark is undesirable for technical or aesthetic reasons, it is necessary to take steps for removing the cutter mark from the finished product. Such removal must usually be effected by means of a grinding treatment which is time-consuming and hence expensive. In view thereof it is very important to counteract the formation of such a cutter mark in the glass portion as much as possible.

Figure 6:
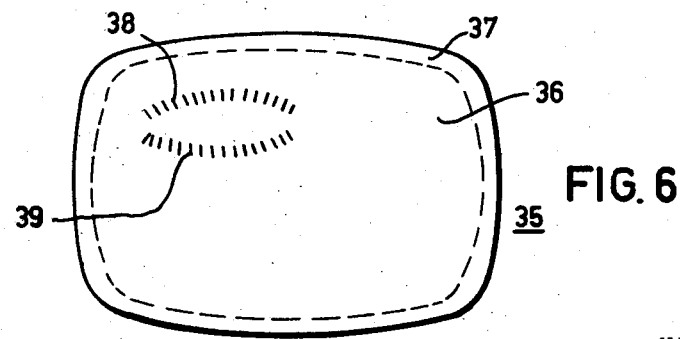
FIGURE 6 shows how the cutter mark present on the non-ground front side of the closure glass of a cathode-ray tube as a result of the action of the cutters on the glass stream is observed on this screen.

FIGURE 6 is a plan view of a glass cup-shaped object 35 which comprises a slightly curved base 36 and an upright edge 37. This object is intended to serve as the front glass or viewing screen of a cathode-ray tube. It is manufactured by moulding from a cut glass portion. It is then common practice to let the glass portion cut off by the cutters fall into a pressing mould. This can usually be carried out so that one cutter mark does not appear on the curved glass portion 36, but somewhere in the upright edge 37 where the presence of such a cutter mark is not troublesome. However, the other cutter mark appears in the surface of the curved base 36 in the form of a plurality of more or less distinct dashes 38 and 39, each of which is found to conisist of a collection of air bubbles or gas occlusions which also occur at areas in the glass located at a greater depth. Such dashes are undesirable for the quality of the object and must be removed by means of a grinding treatment.

In the assumption that the above-mentioned explanation of the occurrence of this cutter mark is correct, I have found that the occurrence of such a cutter mark may be counteracted substantially, if not completely, by cutting the glass portion in a manner other than was usual hitherto.

The principle of this new method of cutting will first be explained with reference to FIGURES 7 and 8 showing two sequential phases of one embodiment of the method according to the invention. In these figures, part of the cross section of the glass stream is indicated by 40, while 41 indicates part of one of the cutter blades which may be used in the method according to the invention. The cutter blade 41 in this example has a shaped edge 42, which shows a plurality of pointed teeth 43, 44 and 45. When the cutting operation takes place by means of a pair of cutters, one cutter or both cutters of which is or are shaped in the manner shown in FIGURES 7 and 8, this cutting operation is initiated, as shown in FIGURE 7, by bringing the surface 46 of the glass stream into contact with the peaks of two more teeth present on the shaped edge 42 of the relevant cutter blade 41. The peaks of two or more teeth of the shaped edge of the cutter blade may be brought into contact with the surface of the glass stream, as shown in FIGURES 7 and 8, in a manner such that this surface is first brought into contact with the peak of only one tooth (in this example tooth 44) and afterwards with the peaks of one or more further teeth (in this example the teeth 43 and 45), or that two or more teeth are brought simultaneously into contact with the surface of the glass stream, thus initiating the cutting operation.

When the tooth 44 contacts with the surface of the glass stream, as shown in FIGURE 8, this surface is locally broken through so that the peak of the relevant tooth, during the further cutting movement, directly finds its way into a portion of the cross-section of the glass stream where the glass has a temperature higher than that at the surface of the glass stream. When the peak of the tooth 44 has reached the position with respect to the cross-section of the glass stream as shown in FIGURE 8, the peaks of the teeth 43 and 45 also contact with the surface of the cross-section of the glass stream and locally break through this surface. As a result of this action, the cross-section of the glass stream, before it is locally broken through, thus substantially has no tendency to deform between the edges of the cutter blades, such as occurs sometimes with cutter blades of known shape and was illustrated hereinbefore with reference to FIGURES 4 and 5. It has been found in practice that, as a result of this other cutting method, the cutter mark disappears substantially or completely in the finished product, so that the grinding treatment can be omitted at least substantially and in certain cases completely.

For a proper understanding it is mentioned that, when the peaks of the teeth have penetrated the cross-section of the glass stream, those portions of the edges which interconnect the peaks of the teeth and are indicated by 47 in FIGURES 7 and 8, cut through the intermediate parts of the cross-sectional area of the glass stream.

If the edges of the blades are provided with teeth substantially throughout their active length, the additional advantage occurs that, when the cutter blades are moved towards each other, a movement of portions of the outer surface of the glass stream in a tangential direction thereof along the edges of the blades is counteracted.

It will be evident that the teeth on the edges of the cutter blades may be formed in different shapes.

FIGURES 9a and 9b are an elevational view and a cross-sectional view, respectively, of one embodiment of part of the edges wherein the edge is provided with pointed teeth 50 which are interconnected by curved parts 51 of the edge.

The embodiment shown in FIGURES 10a and 10b shows teeth 52 having curved peaks, resulting in a more or less undulated shape of the edge.

In the embodiment shown in FIGURES 11a and 11b, the peaks of the teeth 53 are pointed and interconnected by straight parts 54 and 55 of the edge.

Figure 12:
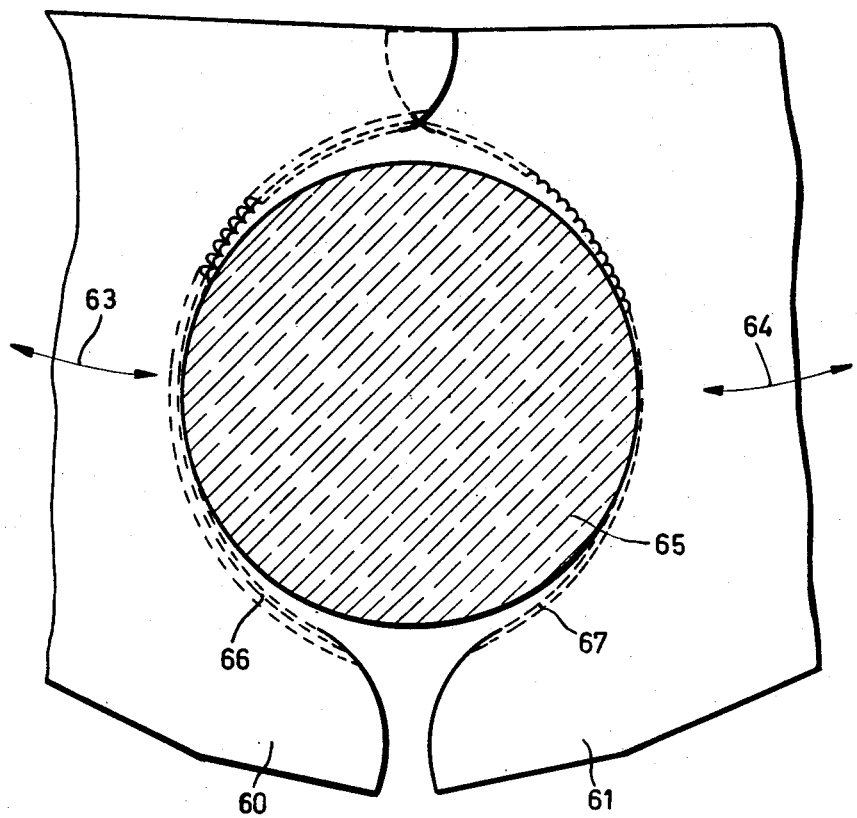
FIGURES 12 to 16 show several embodiments of sets of cutter blades which may be used in accordance with the invention.

FIGURE 12 shows two co-acting cutter blades 60 and 61 which, during cutting, perform a turning-in and a turning-out movement, as indicated by arrows 63 and 64. The cross-section of the glass stream present between the cutter blades is indicated by 65. The shaped edges 66 and 67 of these cutter blades are provided with fine teeth, approximately as shown in FIGURES 9a and 9b.

Figure 13:
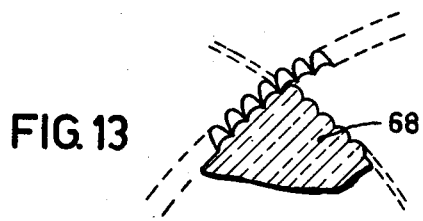

FIGURE 13 shows, on an enlarged scale, what action the edges of the blades exert upon the portion 68 of the cross-section of the glass stream which is in the zone where the edges of the blades slide over each other. In this zone the teeth have a somewhat inclined position with respect to the movements of the cutter blades directed towards each other.

Figure 14:
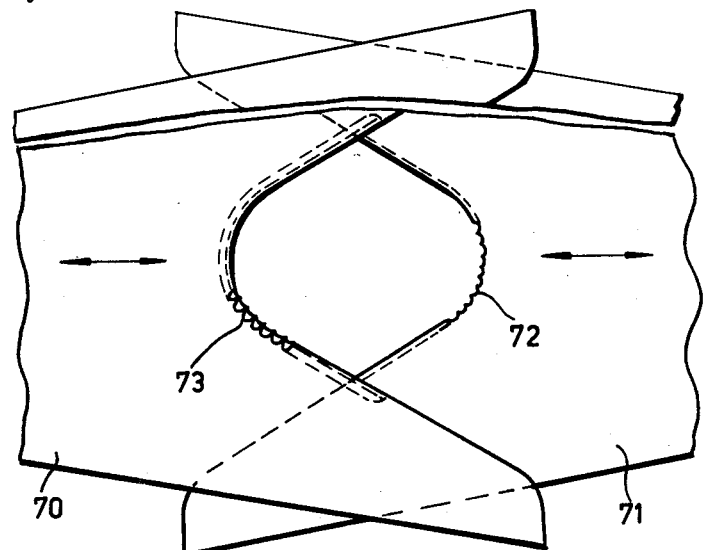

FIGURE 14 shows associated blades 70 and 71 of another embodiment of cutter blades according to the invention. These cutter blades can move towards each other along a straight line during the cutting movement as indicated by arrows. Use is made of a cutter blade having a V-shaped edge, when viewing this blade in a direction at right angles to the flat part thereof. These blades are further shaped so as to show fine teeth 72 and 73 on their edges.

Figure 15:
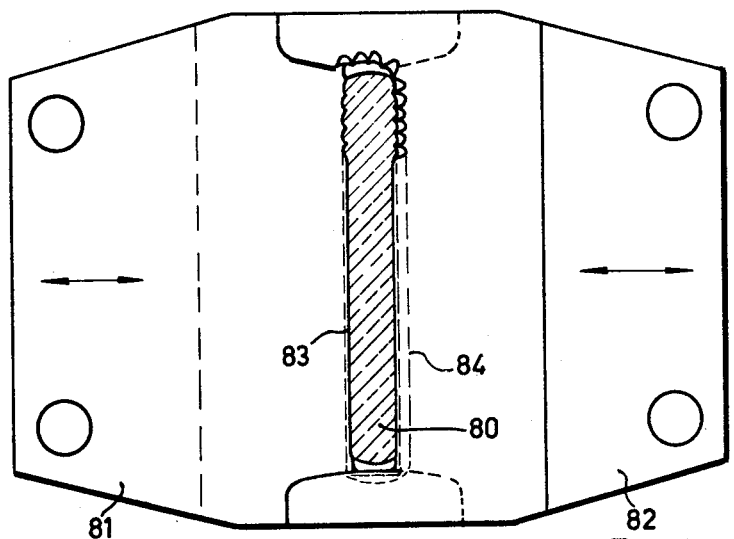
Figure 16:
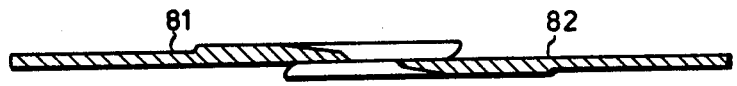

While in the previous figures reference was always made to a glass stream of a circular cross-section, FIGURES 15 and 16 show the structure of a cutter blade which is suited for cutting a glass stream of an elongated cross-section 80 into portions. In fact, it is alternatively possible to obtain such an elongated shape of the glass section by suitable choice of the shape of the outlet aperture of the feeder. The embodiment under consideration utilizes two cutter blades 81 and 82 which can be moved towards and away from each other along a straight line. The edges 83 and 84 are provided with fine teeth.

It will be evident that the invention can also successfully be used in cases where one cutter blade stands still during the cutting movement.

In addition, the invention affords advantages if, during cutting, the edges of the cutter blades move in a more or less tangential direction with respect to the cross-section of the glass stream so that the edges exert a more or less sawing action upon the cross-section of the glass stream. Such tangential movement may be the result of rotation of the edges of the blades about the axis of the cross-section of the glass stream. As an alternative, the tangential movement may be due to either a translation of the edges of the blades along the surfaces of the glass stream, or a combination of a rotation and a translation.

What is claimed is:

1. A method of producing a glass body substantially free of cutting marks from a stream of molten glass comprising the steps of breaking through the surface of the glass stream at a plurality of spaced positions by bringing the glass stream into contact with spaced peaks of a cutting blade, and cutting the portions of the surface of the glass stream intermediate initially cut portions by continuing to move the cutting blade relative to the glass stream.

2. A method of producing a glass body substantially free of cutting marks from a stream of molten glass comprising the steps of breaking through the surface of the glass stream at a plurality of spaced positions by bringing substantially the entire periphery of the glass stream into contact with spaced peaks of a cutting blade, and cutting the portions of the surface of the glass stream intermediate the initially cut portions by continuing to move the cutting blade relative to the glass stream.

References Cited in the file of this patent

UNITED STATES PATENTS

| | | |
|---|---|---|
| 556,615 | Campbell | Mar. 17, 1896 |
| 1,626,737 | La France | May 3, 1927 |
| 1,642,966 | Miller | Sept. 20, 1927 |
| 1,716,991 | Turner | June 11, 1929 |
| 1,879,690 | Kadow et al. | Sept. 27, 1932 |
| 1,959,672 | Haub | May 22, 1934 |
| 2,401,994 | Weber | June 11, 1946 |
| 2,555,735 | Estabrooks | June 5, 1951 |
| 2,825,968 | Baer | Mar. 11, 1958 |
| 2,920,421 | Zimmerman | Jan. 12, 1960 |